United States Patent Office 3,492,191
Patented Jan. 27, 1970

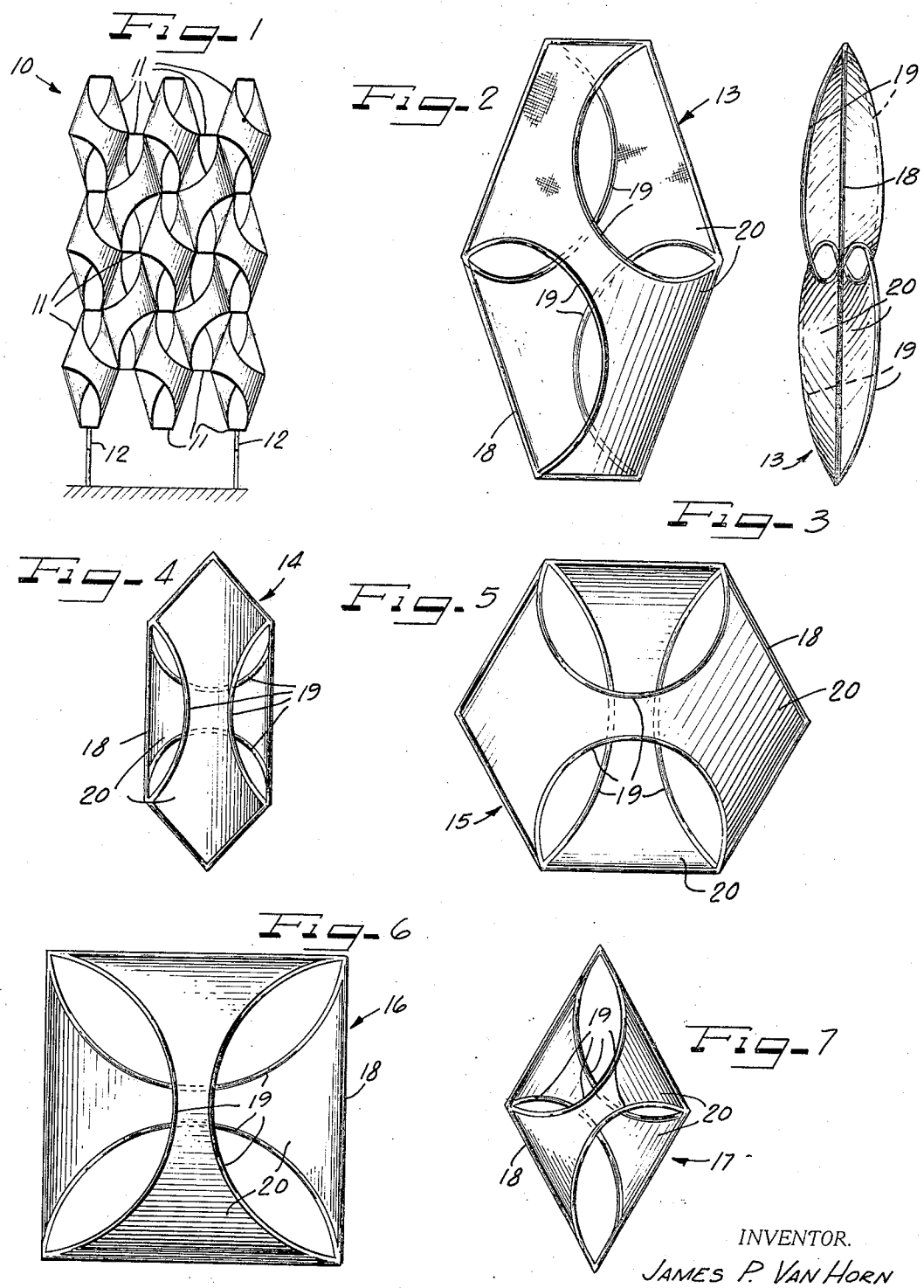

3,492,191
FUNCTIONAL DECORATIVE UNIT
James Paul Van Horn, Rte. 2, Box 166,
Mundelein, Ill. 60060
Filed July 25, 1966, Ser. No. 567,729
Int. Cl. B44c 3/00
U.S. Cl. 161—7                                    9 Claims

ABSTRACT OF THE DISCLOSURE

A decorative unit comprises a frame defining a geometric outline and a pair of inner bars arched toward one another in spaced-apart relation and arched in the same direction away from the plane of the outline. A decorative web extends between the inner bars and the frame.

---

This invention relates to the decorative arts, and more particularly concerns a novel functional decorative unit adapted to attain varied and numerous different decorative effects.

Environmental beautification has challenged much talent. Especially profitable areas for such attention are living space, merchandise display and service environments. In the latter category are included reception rooms, offices, building and hotel lobbies, restaurants, and the like. Decorative devices of various sorts are employed for ornamentation and attractiveness, and considerable emphasis has been directed to improving the appearance of various functional contrivances among which may be mentioned, without limitation, backgrounds, merchandise displays, dividers or partitions, screens, receptacle enclosures, flower and plant supports, attention attractors, etc.

An important object of the present invention is to provide a novel functional decorative unit of great versatility and adaptability in the attainment of the foregoing and other practical artistic endeavors.

To the attainment of this and other objects, there is provided a frame having a plurality of angularly related bars defining a decorative outline, at least one of such bars being of arched shape in two directions between its ends, and a decorative web has a perimeter which matches the frame outline and is secured to the frame bars.

Another object of the invention is to provide varied and numerous different decorative effects employing a functional decorative unit of the type outlined immediately hereinabove.

A further object of the invention is to provide a novel functional decorative unit which is adapted to be inexpensively fabricated from readily available components, simply and at low cost.

Still another object of the invention is to provide a novel functional decorative unit comprising a frame which is adapted to be made from wire or its equivalent and a decorative web material of any desirable fabric.

Other objects, features and advantages of the present invention will be readily apparent from the following detailed description of certain exemplary embodiments of the invention, taken in conjunction with the accompanying drawing in which:

FIGURE 1 is a front elevational view of a contrivance such as a display device, screen, or the like, comprising functional decorative units embodying features of the invention;

FIGURE 2 is a front elevational view of a functional decorative unit embodying features of the invention;

FIGURE 3 is a side elevational view of the unit of FIGURE 2; and

FIGURES 4 to 7, inclusive, illustrate, in front elevational views, respective additional representative examples of functional decorative units embodying features of the invention.

A contrivance 10 as depicted in FIGURE 1 comprises a symmetrical combination of functional decorative units 11, according to the principles of this invention. In this example, the decorative units 11 are attached in side-by-side, mutually supportive relation to provide a screen, background device, part of a merchandise display, flower or plant support, or the like. Although the contrivance 10 may be permanently attached to a wall or floor, or suspended from its supporting structure, it is disclosed as supplied with supporting legs 12 by which it is portably supported in upright position. Although in the illustration of FIGURE 1 a particular relative arrangement and attachment of the units 11 is shown, it will be readily apparent that the number, size, particular geometrical configuration and relative orientation of the units may be varied with great versatility to attain numerous different decorative effects.

A designer's choice of geometric outline may be employed in the units 11. An elongated hexagonal shape in face outline is shown. A similar elongated hexagonal outline is represented in a unit 13 in FIGURE 2. A modified elongated hexagonal outline is depicted in a unit 14 in FIGURE 4. A unit 15 having a regular hexagonal outline is shown in FIGURE 5. A square outline unit 16 is represented in FIGURE 6. In FIGURE 7 a diamond outline FIGURE 17 is exemplified. Numerous other polygonal figures will readily suggest themselves. Various triangular and curved geometric figures may also be employed. Any combinations of straight-sided and curved-sided figures may be readily envisioned without belaboring the illustrations.

Each functional decorative unit, irrespective of its basic outline shape comprises a frame having a plurality of angularly related bars defining a decorative outline and comprising outer and inner frame bars 18 and 19, respectively. In a circular shape a single outer frame bar may be employed. In any of the multi-sided outlines the outer frame bar will be of several angularly related sections, desirably rigidly related to one another by interconnection.

At least one of the frame bars, and by preference the inner frame bar 19 in each instance, is of greater length than the straight line between its ends and is displaced from the rectilinear in two directions. For convenient and brevity such displacement is referred to herein as arched. This term is not intended to be limited to a strictly curved form, although for design purposes the curved arched form does provide pleasing ornamental effects as is evident. At each of its opposite ends the inner bar 19 is attached, desirably rigidly, to the outer frame bar 18. This maintains the two-directional arched relationship of the inner frame bar 19 to the outer bar 18, that is, arched away from the outer bar 18 and arched away from a flat plane within the geometric outline defined by the frame bar 18. This relationship is readily apparent on comparison of FIGURES 2 and 3. Although there is no design limitation upon joinder of the ends of the inner frame bars 19 with the outer frame bars 18 of the units, a practical consideration dictates a desirability for effecting attachment at corners between sections of the outer frame bar 18 where bonding or welding techniques of attachment are employed.

Completing the decorative unit is a decorative web 20 having a perimeter which substantially matches the frame outline and it is secured to the frame bars 18 and 19. The web 20 may be made of any desirable material and although for the most part a prepared fabric may be employed, the web may be constructed in situ as, for example, by attaching strands to and between the bars. Fabric material may comprise textile, wire, metal sheet, plastic sheet, paper sheet, or any other suitable material supplied in an essentially sheet form.

As a result of the multi-directional arched form of the bars 19 and the attachment of the perimeter of the web 20 to the bars 18 and 19, the contour assumed by the web affords a desirable decorative effect. For example, in the flat plane disposition of the outer frame 18 vis a vis the two directional curved arched shape depicted in the inner frame bars 19 in the several examples illustrated, a generally hyperbolic paraboloidal contour, affording interesting surface curvature, highlights and effects. These decorative effects are heightened by enhancing the third dimension through the provision of the two directional arched bars 19 and the webs 20 on both sides of the plane of the frame outline defined by the bar 18 of the particular unit. Further interesting decorative effects accrue from having the bars 19 on one side of the unit relatively crossingly related to the bars 19 on the opposite sides of the unit. It will be readily apparent, also, that various color combinations are thus attainable. Although the frame bars 18 and 19 and the webs 20 may all be of the same color, they are subject to different colors or varigated colors. It will be apparent that interesting contrasts may be attained, for example, by the web 20 on one side of the unit of one color and the web 20 on the opposite side of the unit of a different or contrasting or complementary color.

Although any of the functional decorative units may be employed individually for a desired purpose, they lend themselves effectively to multiple combinations such as the contrivance 10 of FIGURE 1 in which, if desired, the frame bars 18 of contiguous ones of the units 11 may be joint, that is the same frame bar 18 or one or more sections thereof may comprise the outer frame bar of the contiguous units.

From the foregoing it will be apparent that this invention provides a functional decorative unit concept of great versatility and adaptability.

It will be understood that variations and modifications may be effected without departing from the spirit and scope of the novel concepts of this invention.

I claim as my invention:

1. A functional decorative unit comprising:
   a frame having an outer bar structure defining a geometric outline;
   a pair of inner bars, each displaced from the rectilinear to form an arch, said inner bars being arched toward one another in spaced-apart relation and arched in the same direction away from the plane of said outline;
   each of said inner bars having opposite ends rigidly secured to said outer bar structure; and
   a decorative web secured to extend between said inner bars and said outer bar structure.

2. A functional decorative unit according to claim 1, said decorative web having a perimeter which conforms in outline to the space between said inner bars and said outer bar structure and leaving remaining areas between said inner bars and said outer bar structure open.

3. A unit according to claim 1, said outer bar structure comprising a plurality of angularly related sections defining corners therebetween, and said ends of said inner bars being secured in said corners.

4. A unit according to claim 1, comprising a second pair of inner bars complementary to said first mentioned pair of inner bars, said second pair of inner bars being arched toward one another in spaced relation and arched away from the opposite side of said plane from said first mentioned bars, said second pair of bars having respective opposite ends thereof rigidly secured to said outer bar structure, and a second decorative web secured to extend between said second bars and said outer bar structure.

5. A unit according to claim 4, said second bars being disposed in crossing relation to said first mentioned bars.

6. A unit according to claim 5, said outer bar structure comprising a plurality of angularly related sections joining at corners, said inner bars having their ends secured in respective corners, and each of said second bars having at least one end thereof secured in a corner common with an end of said first mentioned inner bars.

7. A unit according to claim 6, said first mentioned pair of bars and said second pair of bars having their ends secured in common corners of said outer bar structure.

8. An assembly comprising a plurality of the units of claim 1 having the outer bar structures thereof joined together to form a unitary structure.

9. An assembly according to claim 8, said outer bar structures comprising straight sections joined together in the contiguous units in the assembly.

References Cited

UNITED STATES PATENTS

| 1,200,487 | 10/1916 | Grimm. | |
| 2,470,416 | 5/1949 | Silver | 161—18 X |
| 2,575,512 | 11/1951 | Erlewine | 161—13 X |

ROBERT F. BURNETT, Primary Examiner

R. O. LINKER, Jr., Assistant Examiner

U.S. Cl. X.R.

47—45; 156—63